April 26, 1966 F. E. OBERMAIER 3,248,056
RESILIENTLY SEATED FLUID CONTROL VALVE
Filed Oct. 18, 1963
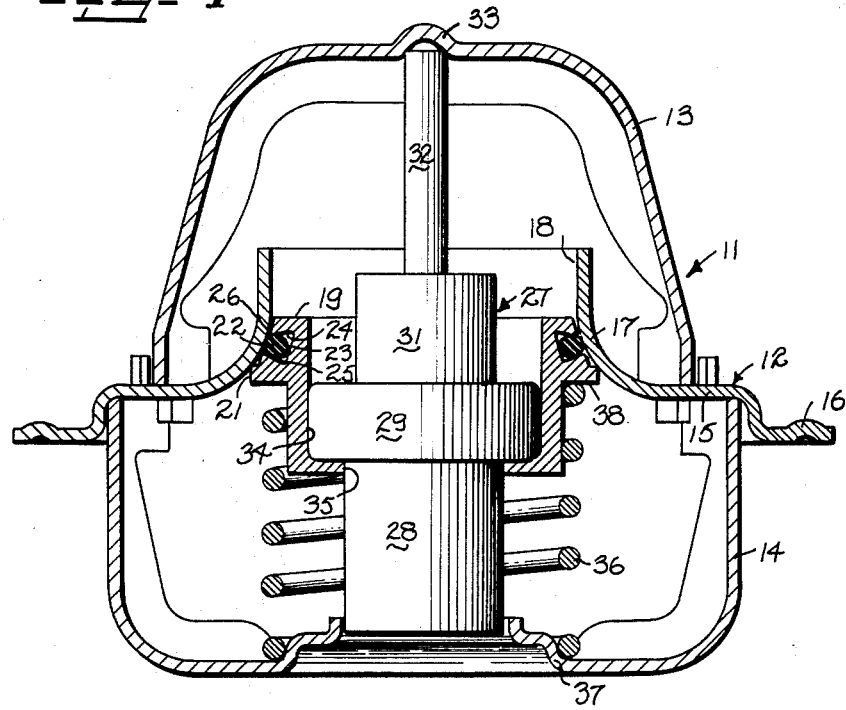
Fig. 1
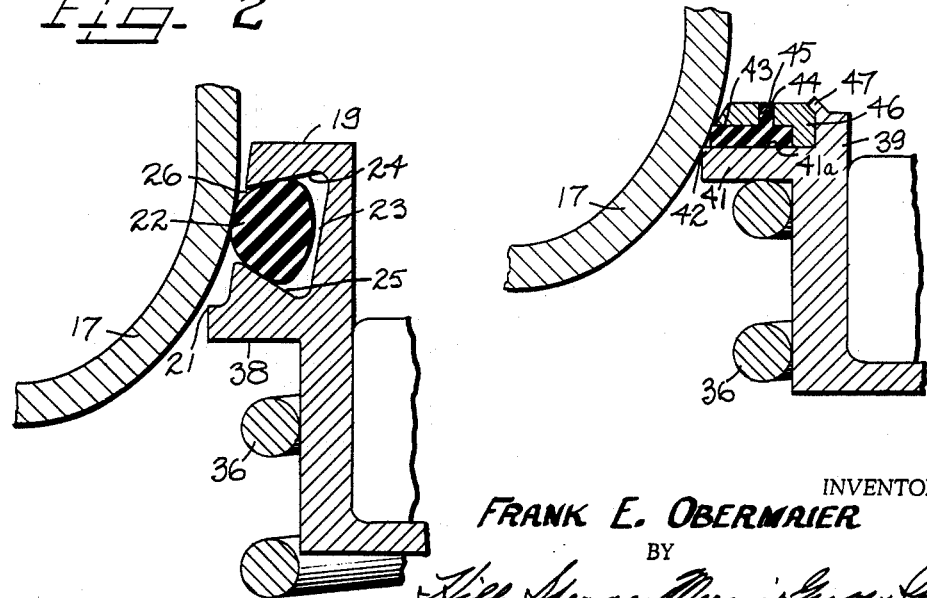
Fig. 2
Fig. 3
INVENTOR.
FRANK E. OBERMAIER
BY
ATTORNEYS April 26, 1966 F. E. OBERMAIER 3,248,056
RESILIENTLY SEATED FLUID CONTROL VALVE
Filed Oct. 18, 1963 2 Sheets-Sheet 2
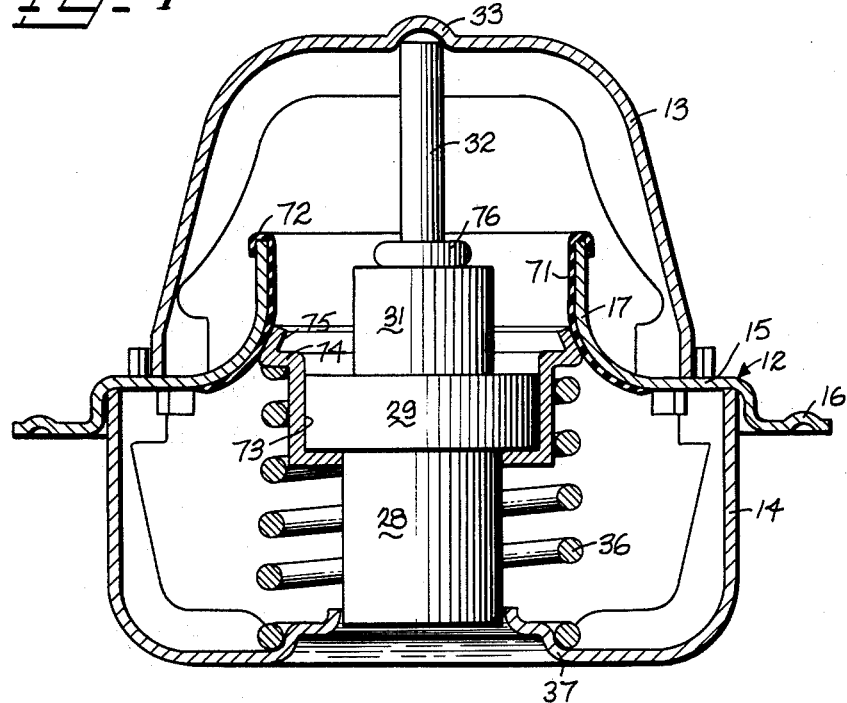
Fig. 7
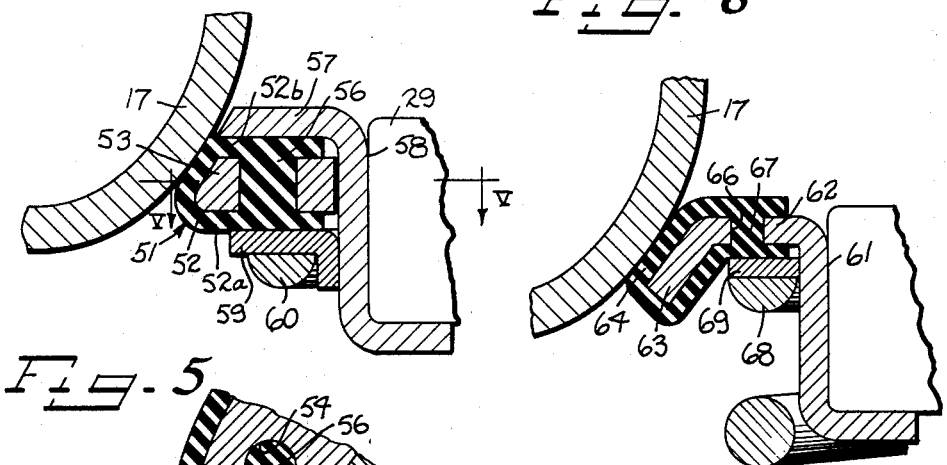
Fig. 4
Fig. 6
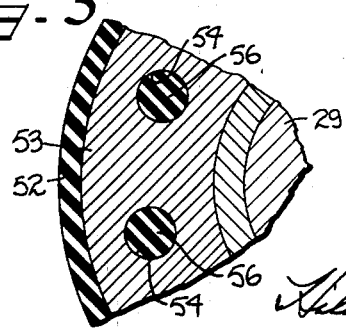
Fig. 5
INVENTOR.
FRANK E. OBERMAIER
BY
ATTORNEYS

United States Patent Office 3,248,056
Patented Apr. 26, 1966

3,248,056
RESILIENTLY SEATED FLUID CONTROL VALVE
Frank E. Obermaier, Park Ridge, Ill., assignor to The Dole Valve Company, Morton Grove, Ill., a corporation of Illinois
Filed Oct. 18, 1963, Ser. No. 317,334
3 Claims. (Cl. 236—34)

This invention relates to fluid control valves and more particularly relates to resiliently seated fluid control valves which are adapted to be employed as waterline thermostats for providing improved control of the fluid coolant circulation in the cooling systems of road vehicles.

While the inventive concepts disclosed herein are described as finding embodiment in waterline thermostats which control the circulation of coolant through the engine block and radiators of road vehicles, it is to be understood that they are much broader in application and may find utility in connection with many other types of fluid control units.

A number of waterline thermostats have been devised which employ metal to metal contact between the valve and seat. This general type of waterline thermostat however has not proven to be entirely satisfactory in use since the sealing effectiveness of the valve on the seat is affected by the entrapment of foreign particles between the surfaces of the valve and seat respectively. Also, since these foreign particles are carried by the fluid coolant at rapid velocities they produce an erosion effect on the surfaces of the valve and valve seat that results in uneven wear which similarly reduces the sealing effectiveness by preventing proper closing.

To obviate the disadvantages of these prior art devices I have devised a waterline thermostat having a resilient surface therein which acts to deformably receive any foreign particles from the fluid coolant stream in order to provide effective sealing between the valve and seat. Further, any irregular wear caused by erosion from these foreign particles is minimized by this resilient material which, even when subjected to uneven wear, is deformable to provide a fluid tight seal.

In accordance with my invention, a waterline thermostat is provided with a ported valve seat that is sealingly engageable with a resilient portion of a valve member. This resilient portion of the valve member can take the form of an O ring, washer or equivalent structure. A spring serves to bias the valve member in a closed position against the seat, while a thermally responsive power member which is operatively connected to the valve member effects relative movement thereof in an opposite direction when a predetermined ambient temperature is reached. Stop means which serve to limit the travel of the valve member caused by the spring can be provided to prevent undue compression of the resilient portion thereof when the valve member is seated, thereby increasing the effectiveness of the waterline thermostat.

In another embodiment of my invention, a resilient liner can be bonded to the valve seat so that a seated valve member is deformably received thereby. With this embodiment, the provision of stop means limiting the travel of the valve member in the closed position is also desirable to prevent undue compression of the resilient liner and a corresponding reduction in its effectiveness.

It is therefore a principal object of the present invention to provide an improved fluid control valve.

Another object of the present invention is to provide an improved resiliently seated fluid control valve which minimizes the adverse effects thereon caused by foreign particles present in the fluid coolant.

A further object of the present invention is to provide an improved fluid control valve having a valve member with a resilient portion thereof which serves to deformably receive foreign particles entrapped between the valve member and the valve seat in order to provide a water tight seal.

A still further object of the present invention is to provide an improved fluid control valve having a valve seat lined with a resilient material which is adapted to deformably receive a seated valve member in order to overcome the adverse effects created by foreign particles carried in the fluid coolant.

A yet further object of the present invention is to provide an improved resiliently seated fluid control valve having stop means which serve to limit the amount of compression of the resilient material when the valve member is in the closed position so as to insure the effectiveness of the resilient material in providing a fluid tight seal.

These and other objects of the prevent invention will appear from time to time as the following specification proceeds and with reference to the accompanying drawings, wherein:

FIGURE 1 is a vertical sectional view through a waterline thermostat constructed in accordance with the principles of the present invention;

FIGURE 2 is a fragmental view of a portion of the valve member shown in FIGURE 1, in a partly closed position;

FIGURE 3 is a fragmental view of a portion of the valve member in another embodiment of the present invention;

FIGURE 4 is a fragmental view of a portion of the valve member in a still further embodiment of the present invention;

FIGURE 5 is a sectional view, taken along the lines V—V, of the embodiment of the present invention shown in FIGURE 4;

FIGURE 6 is a fragmental view of a portion of the valve member in a yet further embodiment of the present invention;

FIGURE 7 is a vertical sectional view through a waterline thermostat constructed in accordance with the principles of the present invention wherein a resilient liner is bonded to the valve seat.

Referring to the drawings, in FIGURE 1 a waterline thermostat 11 is shown comprising a ported valve seat member 12 having an overlying stirrup 13 extending therefrom and a combination power unit guide and spring support or base wall piece 14 connected thereto on the opposite side thereof from the stirrup 13. The stirrup 13 and base wall piece 14 are affixed to a transverse portion 15 of the ported valve seat member 12 by means of riveting or any other suitable connecting means.

An outwardly extending mounting flange 16 is integrally formed with the seat member 12 and provides a means for mounting the thermostat in a fluid conduit so that the valve can control the passage of fluid therethrough. Opposite the mounting flange 16 the transverse portion 15 of the seat member 12 extends into a curvilinear neck portion 17 terminating in a port 18.

A cup-shaped valve member 19 is provided having a primary valve 21 integrally formed therewith and a secondary valve 22, composed of a resilient material and preferably in the form of an O ring, securely retained in a groove 23. Retention of the O ring 22 in the groove 23 is insured by tapering a top wall 24 and a bottom wall 25 of the groove 23 so that they define a narrow open-end 26. Thus, as is shown in FIGURE 2, when the primary valve 21 is in the unseated position and the secondary valve 22 is seated, internal pressure on the upstream side of the valve 22 will cause it to deform against the tapered walls 24 and 25, which will in turn, thereby act to lock the secondary valve in the groove 23.

Since the contacting of the primary valve 21 on the surface of the curvilinear neck 17 will normally govern the point of contact and degree of compression of the secondary valve 22, the effectiveness of the secondary valve 22 to deformably receive foreign particles trapped between the curvilinear neck 17 and secondary valve 22 can be controlled by the dimensioning of the primary valve 21. Thus, in order to insure maximum resilience of the secondary valve so as to minimize the adverse effects of foreign particles from the fluid coolant, the primary valve should be dimensioned to permit the secondary valve to sealingly engage the surface of the curvilinear neck 17 without undue compression of the valve member 22.

A temperature sensitive power unit 27 is shown and can be of the well known "solid-fill" type comprising a temperature sensitive portion 28, a collar 29, a power member guide portion 31 and a power member 32 which abuts against a recessed portion 33 formed in the overlying stirrup 13. For purposes of simplicity, that portion of the power unit 27 which includes the temperature sensitive portion 28, the collar 29, and the guide portion 31 is hereafter collectively referred to as the casing. The thermostat contains a fusible thermally expansible material within the temperature sensitive portion 28 which expands when the ambient temperature rises to or above the critical temperature of the expansible material. The expansible material then acts against a diaphragm within the power unit which abuts or is connected to the power member 32 so that heating of the temperature sensitive portion 28 above the critical temperature of the expansible material contained therein will effect relative extensible movement of the power member 32 from the casing of the power unit.

The cup-shaped valve member 19 has an inner recess 34 which is sized to receive the collar 29 and a central hole 35 which embraces the temperature sensitive portion 28 of the temperature sensitive power unit 27. A coil spring 36 is compressed between a spring guide 37 formed in the base wall piece 14 and an outwardly extending flange 38 integrally formed in the valve member 19. Thus, the primary and secondary valves 21 and 22 respectively, are urged in the seated position by the compression spring 36 while the temperature sensitive power unit 27, when energized, acts against the spring to unseat the primary and secondary valves from the curvilinear neck portion 17. The spring 36, however, will act as a return spring for the power unit 27 and additionally serves the purpose of mounting the valve member on the power unit. Mounting of the valve member on the power unit in this manner effects a substantial reduction in production costs and facilitates assembly of the valve.

Another embodiment of my invention which holds up particularly well under the high pressure conditions which can be encountered in an automobile cooling system is illustrated in FIGURE 3. This embodiment includes a cup-shaped valve member 39 which is provided with a radially outwardly extending flange 41 having an upper surface 41a that terminates in a primary valve 42 seatable on the curvilinear neck 17. On the downstream side of the primary valve 42 is a secondary valve 43, preferably composed of a resilient material such as for example, soft rubber or Teflon, which serves to minimize the previously described adverse effects on the waterline thermostat caused by foreign particles in the fluid coolant. A flange 46 furnishes back-up support for the resilient valve 43 and is secured thereto by means of a series of holes 45 which are adapted to snugly receive a plurality of nipples 44 integrally formed in the resilient valve 43. The flange 46 and valve 43 can be mounted to the valve member 39 by press fitting a retaining rim 47 over the flange 46. If desired however, an adhesive may be used, alone or in conjunction with a mechanical bond, to retain the valve 43 and flange 46 on the valve member 39.

In FIGURES 4 and 5 another embodiment of my invention is shown wherein only a single valve 51 is employed to effect a fluid tight seal on the curvilinear neck 17. The valve 51 includes an outer covering 52, having an upstream portion 52a and a downstream portion 52b, and is preferably composed of a resilient material which can be coated over, or otherwise applied to an inner ring 53. In order to obtain better securement of the outer covering 52 to the ring 53 a plurality of holes 54 can be provided in the ring 53 which are adapted to receive a series of stem-like portions 56 integrally formed with and connecting the upstream and downstream portions 52a and 52b of the outer resilient covering 52. The valve 51 is retained between a radial flange portion 57 of a cup-shaped valve member 58 and a mounting ring 59 which is adapted to receive one end of a compression spring 60. Longer valve life and better operation under high pressures can be obtained by dimensioning the radial flange portion 57 so that it provides the maximum back-up support for the valve 51.

In the embodiment of my invention illustrated in FIGURE 6 a cup-shaped member 61 is shown having a radially outwardly extending flange portion 62 which terminates in a downwardly extending outer ring 63. A resilient covering 64 is provided over the flange portion 62 and rim 63 to effect a fluid tight seal with the curvilinear neck 17. A series of holes in the flange portion 62, such as shown at 66, are adapted to receive a plurality of stem-like portions 67 to provide better securement of the covering 64 to the cup-shaped member 61. The entire assembly can be mounted in the waterline thermostat by means of a compression spring 68 which abuts against a ring 69.

In each of the embodiments of my invention illustrated in FIGURES 3, 4 and 6 those portions of the structure of the waterline thermostat not shown and described may be constructed in accordance with the manner shown and described in connection with the embodiment of my invention illustrated by FIGURE 1 or, in accordance with conventional structures well known to those skilled in this art.

Similarly, in the embodiment of my invention illustrated by FIGURE 7, like numerals are used to show portions of the structure which are similar to those shown and described in connection with the embodiment illustrated by FIGURE 1. With this embodiment however, the ported valve seat member 12 has a resilient liner 71. This liner can be coated onto the seat member 12 or bonded thereto and can be provided with a crimped portion 72 which is adapted to snugly embrace the port 18 of the seat member 12. A cup-shaped valve member 73 having a radially extending portion 74 which terminates in an upwardly turned frusto conical outer rim 75 is adapted to seat upon the resilient surface of the liner 71. Thus, the liner 71 will act to deformably receive any foreign particles which are trapped between it and the outer rim 75 so as to effect a fluid tight seal with the rim 75. Similarly, any irregularities in the rim 75, due to uneven wear or otherwise, will be compensated for by the resilient liner when the rim is seated thereon.

In order to prevent undue compression of the resilient liner by the seated rim 75, an enlarged portion or knob 76 can be integrally formed with the power member 32 and positioned to act as a stop means for limiting the travel of the valve member 73 in the seated position.

It will be understood that these embodiments of the invention have been used for illustrative purposes only and that various modifications and variations of the present invention may be effected without departing from the spirit and scope of the novel concepts thereof.

I claim as my invention:
1. A fluid controlled valve comprising:
   a ported valve seat member having a stirrup and a base connected thereto and extending from opposite sides thereof,
   a temperature sensitive power unit having a casing con- nected to said base and a power member relatively extensible therefrom, said power member having one end thereof embraced by said stirrup for providing relative movement of said casing, valve means extending from said casing and operatively connected thereto for effecting axial movement of said valve means with respect to said port when a predetermined ambient temperature is reached, a primary valve integrally formed with said valve means and seatable on said valve seat member, a groove formed in said valve means on the downstream side of said primary valve having a pair of tapered walls which cooperate to define an undercut open end, an O ring composed of a resilient material and having a diameter in its unstressed condition which is greater than the width of the open end for locking said O ring in said groove and having a cross-sectional area less than a cross-sectional area of said groove and being initially spaced from a bottom wall of said groove, spring means biasing said primary valve and said O ring in a closed position, whereby said primary valve and said O ring cooperate to effect a fluid tight seal with said valve seat member.

2. A fluid control valve comprising:
a housing,
a chamber formed within said housing having an inlet extending thereto and an outlet leading therefrom,
a temperature sensitive power unit fixedly secured within said chamber having a power member relatively extensible therefrom,
said chamber having a restricted portion thereof,
a valve seat formed at said restricted portion,
a valve head attached to said power member,
said valve head having an annular groove disposed circumferentially thereon,
said annular groove having an open end and an undercut portion thereof,
an annular ring of substantially resilient material snap fitted into said undercut portion of said annular groove and having a cross-sectional area less than the cross-sectional area of said annular groove and being initially spaced from a bottom wall of said groove,
said valve head and said annular ring being cooperable with said valve seat.

3. A fluid coolant thermostat comprising:
a housing,
a chamber formed within said housing having an inlet extending thereto and an outlet leading therefrom,
a temperature sensitive power unit fixedly secured within said chamber having a power member relatively extensible therefrom,
said chamber having a restricted portion thereof,
a valve seat formed at said restricted portion,
a valve head attached to said power member,
said valve head comprising a first part and a second part,
said first part having an annular groove disposed circumferentially thereon,
said annular groove having an open end and an undercut portion thereof,
an annular ring of substantially resilient material snap fitted into said undercut portion of said annular groove and having a cross-sectional area less than the cross-sectional area of said annular groove and being initially spaced from a bottom wall of said groove,
said annular ring being cooperable with said valve seat,
said second part having a substantially rigid edge cooperable with said valve seat,
said edge maintaining said first part spaced from said valve seat,
said first part of said valve head being positioned downstream of said second part.

References Cited by the Examiner

UNITED STATES PATENTS

| 2,925,334 | 2/1960 | Henze | 251—332 X |
| 2,929,401 | 3/1960 | Cowan | 251—332 X |
| 3,009,681 | 11/1961 | Carter | 251—332 |
| 3,087,676 | 4/1963 | Neher et al. | 236—34 |

FOREIGN PATENTS

| Ad. 71,885 | 8/1959 | France. |
| 1,203,653 | 8/1959 | France. |

EDWARD J. MICHAEL, *Primary Examiner.*